US010064133B2

(12) United States Patent
Berntsen et al.

(10) Patent No.: US 10,064,133 B2
(45) Date of Patent: *Aug. 28, 2018

(54) RADIO COMMUNICATION SYSTEM

(71) Applicant: NORDIC SEMICONDUCTOR ASA, Trondheim (NO)

(72) Inventors: Frank Berntsen, Heimdal (NO); David Alexandre Engelien-Lopes, Malvik (NO); Joel David Stapleton, Trondheim (NO)

(73) Assignee: NORDIC SEMICONDUCTOR ASA, Trondheim (NO)

(*) Notice: Subject to any disclaimer, the term of this patent is extended or adjusted under 35 U.S.C. 154(b) by 6 days.

This patent is subject to a terminal disclaimer.

(21) Appl. No.: 15/183,706

(22) Filed: Jun. 15, 2016

(65) Prior Publication Data

US 2016/0295508 A1    Oct. 6, 2016

Related U.S. Application Data

(63) Continuation of application No. 14/342,765, filed as application No. PCT/GB2012/052207 on Sep. 7, 2012, now Pat. No. 9,398,534.

(30) Foreign Application Priority Data

Sep. 8, 2011  (GB) .................................. 1115517.3

(51) Int. Cl.
*H04W 52/02*  (2009.01)
*H04W 72/04*  (2009.01)

(52) U.S. Cl.
CPC ... *H04W 52/0216* (2013.01); *H04W 52/0225* (2013.01); *H04W 52/0229* (2013.01);
(Continued)

(58) Field of Classification Search
CPC ......... H04W 52/0225; H04W 52/0229; H04W 52/0241; H04W 52/0261; H04W 52/0274;
(Continued)

(56) References Cited

U.S. PATENT DOCUMENTS 5,155,479 A    10/1992   Ragan et al.
6,192,230 B1    2/2001   Van Bokhorst ............... 370/311
(Continued)

FOREIGN PATENT DOCUMENTS

EP    1292051 A1    9/2002
JP    04-213229 A1    4/1992
(Continued)

OTHER PUBLICATIONS

Notice of Reasons for Refusal from corresponding Japanese Patent Appl. No 2014-526069, dated Mar. 21, 2017.
(Continued)

*Primary Examiner* — Joshua Kading
(74) *Attorney, Agent, or Firm* — Koppel, Patirck, Heybl & Philpott

(57) ABSTRACT

A radio communication system comprises a radio transmitter (2), and a radio receiver (12) configured to receive radio transmissions from the transmitter. The transmitter (2) uses a transmitter clock signal to transmit a succession of connection-event data packets (22*a'*, 22*b'*, 22*c'*) according to a predetermined schedule. The receiver (12) enters a sleep state between receiving successive connection-event data packets from the transmitter (2), in which it does not receive and process radio transmissions from the transmitter. It uses a receiver clock signal to determine when a predetermined number of receiver clock cycles has elapsed after receiving one of the connection-event data packets (22*b'*), and then enters a ready state. The predetermined number of receiver clock cycles is the number of receiver clock cycles (34*a*) that
(Continued)

elapsed between the respective receipts of two of the connection-event data packets (22a', 22b') received by the receiver (12) minus a correction factor (38).

32 Claims, 3 Drawing Sheets

(52) U.S. Cl.
CPC ... *H04W 52/0241* (2013.01); *H04W 52/0261* (2013.01); *H04W 52/0274* (2013.01); *H04W 72/0446* (2013.01); *Y02D 70/00* (2018.01); *Y02D 70/144* (2018.01); *Y02D 70/20* (2018.01)

(58) Field of Classification Search
CPC .......... H04W 72/0446; H04W 52/0216; Y02B 60/50
See application file for complete search history.

(56) References Cited

U.S. PATENT DOCUMENTS

| | | | |
|---|---|---|---|
| 7,120,390 | B2 | 10/2006 | Grundvig et al. |
| 9,398,534 | B2 * | 7/2016 | Berntsen ............ H04W 52/0216 |
| 2002/0131370 | A1 | 9/2002 | Chuah et al. |
| 2003/0137969 | A1 | 7/2003 | Abdesselem |
| 2005/0153751 | A1 | 7/2005 | Bultan et al. |
| 2006/0182056 | A1 | 8/2006 | Kim et al. |
| 2010/0150257 | A1 | 6/2010 | Lee et al. |
| 2010/0303185 | A1 | 12/2010 | Haartsen |
| 2012/0275366 | A1 | 11/2012 | Anderson |

FOREIGN PATENT DOCUMENTS

| | | |
|---|---|---|
| JP | 2008-048027 A | 2/2008 |
| JP | 2009-219091 A | 9/2009 |
| JP | 2009219091 A | 9/2009 |
| WO | WO 2010/014992 | 2/2010 |
| WO | WO2010/014992 A1 | 2/2010 |

OTHER PUBLICATIONS

Notification of Transmittal (PCT/ISA/220) of the International Search Report (PCT/ISA/210) and the Written Opinion of the International Searching Authority (PCT/ISA/237) for PCT/GB2012/052207 dated Nov. 30, 2012.

J.X. Lee, et al. "A Scheme to Compensate Time Drift in Time Difference of Arrival Localization Among Non-Synchronized Sensor Nodes", Institute for Infocomm Research, Nanyang Technical University, Singapore, Apr. 4, 2009.

"Specification of the Bluetooth System Experience More", Core System Package [Low Energy Controller volume], Bluetooth Specification Version 4.0 [vol. 6], Jun. 2010, pp. 1-138.

Iman Shames and Adrian N. Bishop, "Relative Clock Synchronization in Wireless Networks", IEEE Communications Letters, vol. 14, No. 4, Apr. 2010, pp. 1-3.

Manuel Flury, et al., "Clock-Offset Tracking Software Algorithms for IR-UWB Energy-Detection Receivers", EPFL, School of Computer and Communication Sciences, Deutsche Telekom Laboratories, TU Berlin, Sep. 9-11, 2009, pp. 534-539.

Japanese Office Action relating to cited Application No. 2014-529069 dated May 27, 2016.

Decision of Refusal for Application No. 2014-529069; dated Feb. 20, 2018.

* cited by examiner

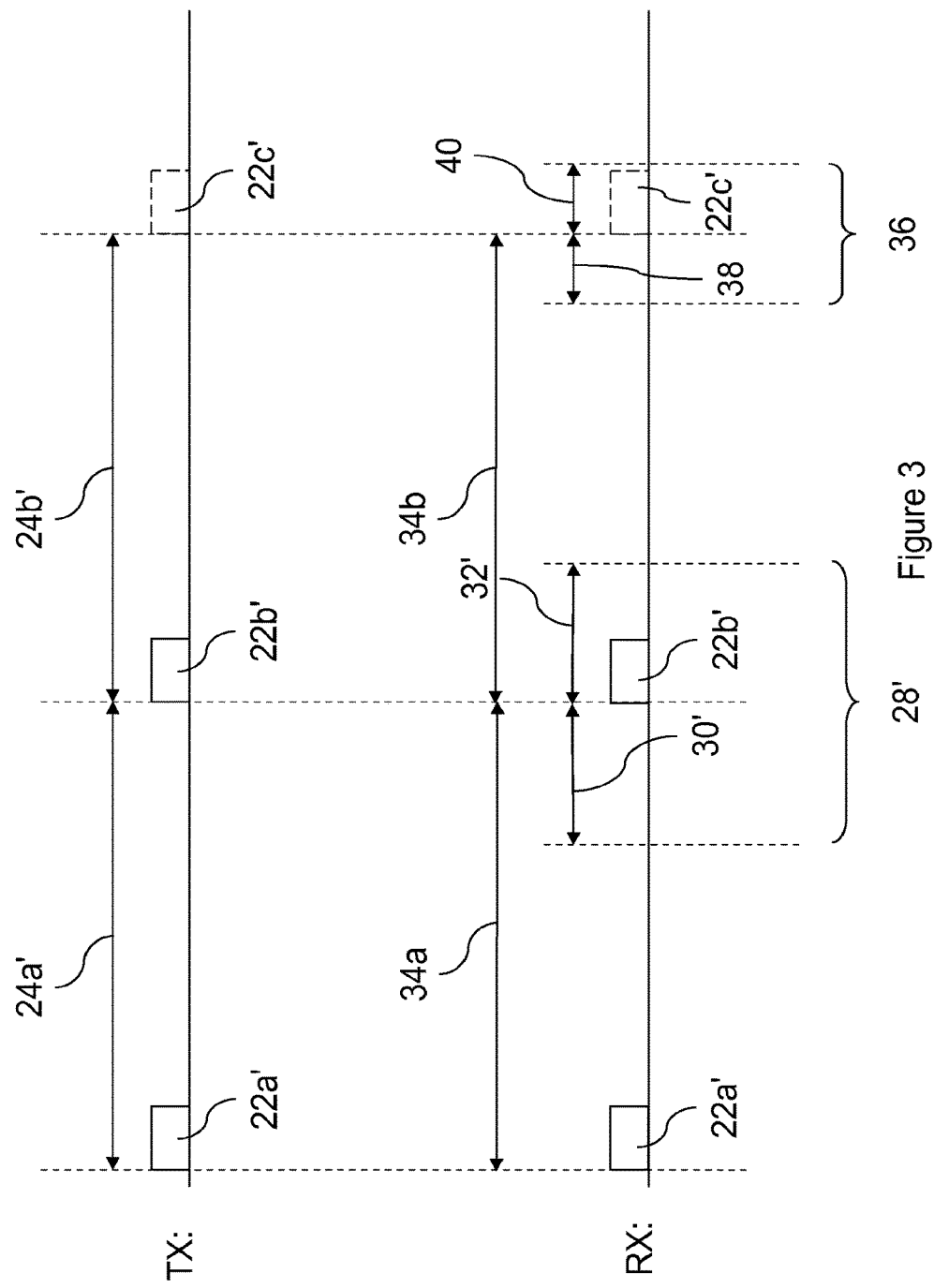

RADIO COMMUNICATION SYSTEM

This application is a continuation of, and claims the benefit of, U.S. patent application Ser. No. 14/342,765 to Berntsen et al., filed on Mar. 4, 2014, claiming priority of PCT/GB2012/052207, filed on Sep. 7, 2012, and GB1115517.3, filed on Sep. 8, 2011, which are incorporated in their entirety herein by reference.

This invention relates to a radio communication system comprising a radio transmitter and a radio receiver.

Certain battery-operated devices, such as wireless temperature sensors and wireless bicycle speedometers, contain radio transmitters and/or receivers that are optimised for low power consumption. One way in which they save power is to transmit data in short bursts, rather than more slowly over a longer period of time. This allows a transmitter and/or receiver to enter a low-energy sleep state between data bursts, in which parts of the radio circuitry and processing logic can be powered down. The transmitter or receiver can be arranged to wake in time for the next data transmission, using an internal clock.

If the transmitter and receiver have synchronised clocks, they can both wake just in time for each transmission. However, if the receiver's clock is not necessarily synchronised with the transmitter's clock (e.g. if one is running slightly faster than the other), the receiver may have to be configured to wake earlier than it otherwise would, in order to allow for inconsistencies between the two clocks. If the receiver does not start listening for signals from the transmitter sufficiently early, it might miss the start of a transmission.

One such approach to operating a radio transmitter and a radio receiver with unsynchronised clocks with power constraints is described in the Bluetooth Low Energy™ (BLE) Link Layer [Bluetooth Core Specification Version 4.0, Volume 6, Part B, published 30 Jun. 2010-http://www.bluetooth.org/Technical/Specifications/adopted.htm].

In such an approach, exemplified in FIG. 2, a master radio transmitter (TX) initiates a connection event with a slave radio receiver (RX) by transmitting a data packet 22a. The master device transmits a succession of regularly-spaced connection event initiation packets 22a, 22b, 22c, with a constant interval (connInterval) 24a, 24b between the starts of the successive connection events. The intervals are measured using a clock in the transmitter device.

The slave receiver conserves energy by sleeping between connection events, when no data packets are being exchanged. The slave uses the start time of a connection event 22a, 22b, 22c as an "anchor point" for calculating the time when it should expect to receive the start of the next connection event based on the known constant interval between transmissions. It determines these times using an internal clock.

In FIG. 2, the receiver determines when an interval 26b of length connInterval has elapsed after receiving a first data packet 22b of a connection event and then wakes from sleep to open a listening window 28 some time 30 before the expected arrival of the first data packet 22c of the next connection event. The listening window 28 is opened earlier than should ideally be necessary because the slave clock may be running faster or slower than the master clock. The amount of time 30 (windowWidening) by which it is opened early is the sum of the worst-case clock accuracy of the master device (while it is in a sleep state), and the clock accuracy of the slave device (while it is in a sleep state), expressed as parts per million (ppm), and multiplied by the amount of time 26b that has elapsed since receipt of the last anchor point received by the slave. The slave can keep the listening window 28 open for an equal amount of time 32 (windowWidening) after the expected arrival time if necessary (i.e. if the data packet has not been received). The listening window 28 may therefore have a width of up to 2×windowWidening.

In a typical example, the clock of the master device may be known to have a worst-case accuracy of +/−five-hundred ppm, while the clock of the slave device may be known to have an accuracy of +/−five-hundred ppm. If the regular connection interval 24a, 24b, 26a, 26b (connInterval) is intended to be one second long, the listening window 28 may be up to two milliseconds long.

This approach provides significant power savings compared with having the receiver constantly powered up, by allowing the receiver to sleep either side of the listening window 28. Nevertheless, the present invention seeks to provide a radio receiver that is yet more power efficient.

When viewed from a first aspect the invention provides a radio communication system comprising a radio transmitter and a radio receiver configured to receive radio transmissions from the radio transmitter, wherein the radio transmitter is configured to use a transmitter clock signal to transmit a succession of connection-event data packets by radio according to a predetermined schedule, and wherein the radio receiver:
  is configured to enter a sleep state between receiving successive connection-event data packets from the radio transmitter, in which sleep state the radio receiver does not receive and process radio transmissions from the radio transmitter; and
  is configured to use a receiver clock signal to determine when a predetermined number of receiver clock cycles has elapsed after receiving one of the connection-event data packets and, in response, to enter a ready state in which the radio receiver is able to receive and process radio transmissions from the radio transmitter, wherein the predetermined number of receiver clock cycles is dependent on how many receiver clock cycles elapsed between the respective receipts of two of the connection-event data packets received by the radio receiver.

From another aspect the invention provides a method of operating a radio transmitter and a radio receiver, comprising:
  the radio transmitter using a transmitter clock signal to transmit a succession of connection-event data packets by radio according to a predetermined schedule;
  the radio receiver entering a sleep state between receiving successive connection-event data packets from the radio transmitter, in which sleep state the radio receiver does not receive and process radio transmissions from the radio transmitter; and
  the radio receiver using a receiver clock signal to determine when a predetermined number of receiver clock cycles has elapsed after receiving one of the connection-event data packets and, in response, entering a ready state in which the radio receiver is able to receive and process radio transmissions from the radio transmitter, wherein the predetermined number of receiver clock cycles is dependent on how many receiver clock cycles elapsed between the respective receipts of two of the connection-event data packets received by the radio receiver.

From a further aspect the invention provides a radio receiver, suitable for receiving radio transmissions from a radio transmitter that transmits a succession of connection-event data packets by radio according to a predetermined schedule, wherein the radio receiver:

is configured to enter a sleep state between receiving successive connection-event data packets from the radio transmitter, in which sleep state the radio receiver does not receive and process radio transmissions from the radio transmitter; and is configured to use a receiver clock signal to determine when a predetermined number of receiver clock cycles has elapsed after receiving one of the connection-event data packets and, in response, to enter a ready state in which the radio receiver is able to receive and process radio transmissions from the radio transmitter, wherein the predetermined number of receiver clock cycles is dependent on how many receiver clock cycles elapsed between the respective receipts of two of the connection-event data packets received by the radio receiver.

Thus it will be seen by those skilled in the art that, in accordance with the invention, the length of time between the radio receiver receiving one of the connection-event data packets and the receiver entering the ready state can be adjusted depending on the arrival times of previously-received connection-event data packets. Because the arrival times contain information relating to differences in the transmitter clock frequency and the receiver clock frequency, the radio receiver can use them to compensate for long-term drift between the receiver clock signal and the transmitter clock signal.

This then enables the receiver to remain in the ready state for a much shorter length of time than would be the case if no such compensation were made, since any remaining uncertainty in the arrival time of the next connection-event data packet is limited to fast-changing timing artefacts, such as those arising from electrical or magnetic interference. In particular, in contrast to the prior art approach mentioned previously, a listening window does not need to allow for worst-case long-term or slow drift between the clock signals, since this is compensated for by varying the time of entry into the ready state. The listening window can therefore be significantly shorter.

An underlying insight behind the present invention is that potential errors in the transmitter and receiver clock signals can be split into fast-changing (short-term) errors and slow-changing (long-term) errors. Greater power efficiency can be achieved by treating these two classes of error differently. For example, if a device comprising a radio receiver embodying the invention experiences a physical shock (e.g. from being dropped on the floor), this can result in an immediate, short-term change in the output frequency of its clock signal. However, the clock frequency may soon revert to its long-term average frequency after the shock. Electrical noise and rapid changes in ambient temperature may have similar short-term effects. Such effects cannot readily be predicted and are best dealt with by having a listening window that is sufficiently wide to allow for such errors.

By contrast, differences in the fundamental frequencies of two crystal oscillators, perhaps due to manufacturing differences, can mean that two clock signals derived from the respective oscillators will drift predictably relative to each other. Although the relative timing error might be as significant as that caused by a shock (e.g. 20 parts-per-million), its rate of change is very low, making the error predictable. Other factors such as the age of a crystal oscillator, and gradual changes in ambient temperature, can also cause slow-changing drift over relatively long timescales (e.g. over hours, rather than seconds or milliseconds).

For the present purposes, a "slow-changing" or "long-term" error may be considered to be any error in a clock signal that causes the clock signal to change by less than one part per million (ppm) in each interval between successive ones of the data packets, over the duration of the interval, in contrast to a fast-changing or short-term error. Where the intervals are irregular, a maximum or mean or other average interval may be considered for this definition.

By using information relating to the arrival times of received data packets, e.g. the size of the interval between the two most-recently received connection-event packets, to model and compensate for relatively-stable, long-term errors, a receiver embodying the invention need only enter the ready state sufficiently enough to cope with fast-changing errors. The receiver can thereby reduce the amount of time it needs to spend in the ready state and increase its time in a sleep state, thus saving energy.

The two connection-event data packets, upon whose respective receipts said number of receiver clock cycles depends, may be any of the received connection-event data packets. However, in preferred embodiments, they are successively-received connection-event data packets. In particular, they are preferably the two most-recently received connection-event data packets. In this way, the timing of when the receiver enters the ready state can depend on the most up-to-date information available to the receiver regarding the transmission of the connection-event data packets by the transmitter.

The receiver is preferably configured to update a variable stored in memory (e.g. RAM or a register) with a value related to the number of receiver clock cycles elapsed between the respective receipts of the two connection-event data packets. The value may be the number of clock cycles. This updating preferably occurs after every successfully-received connection-event data packet. In this way, long-term drift can be modelled with very low memory requirements; this is very desirable for resource-constrained radio receivers.

In some embodiments, the predetermined number of receiver clock cycles may be a linear function of the number of receiver clock cycles that elapsed between the said respective receipts; i.e. during the interval between the two connection-event packets. In some embodiments the number of receiver clock cycles may equal the number of receiver clock cycles that elapsed between the said respective receipts (or a multiple or fraction thereof), minus a correction factor. This correction factor effectively then determines how early the receiver opens a listening window before the expected arrival of the next connection-event data packet. The correction factor may increase with the number of receiver clock cycles elapsed since receipt of the last connection-event data packet; for example, it may equal the number of clock cycles multiplied by a base value. In this way, if one of the connection-event data packets is lost, the receiver will expand the listening window for the next connection-event data packet, in order to proportionally compensate for the short-term variations relative to the time since the last received connection-event data packet.

The correction factor, or the base value, may be constant for all communications with a particular transmitter, or for the duration of a connection with a transmitter (where a "connection" may be as defined in the Bluetooth Low Energy™ Link Layer). It may be related to known or assumed short-term error characteristics of the transmitter clock and the receiver clock. Alternatively, the correction factor, or base value, may be modified; for example, in response to timing information relating to already-received connection-event data packets, such as the amount of variation between expected and actual times of receipt of connection-event data packets. In this way, short-term, fast-changing errors may also be modelled by the receiver, to allow for further potential reductions in the duration of a listening window. In either case, the radio receiver may use a substantially wider listening window when receiving the first one or two connection-event data packets of a new communication session, until the receiver has acquired sufficient information to start compensating for long-term drift.

The receiver may be configured to remain in a ready state for a maximum number of receiver clock cycles equal to twice the constant correction factor. Thus each listening window may be up to twice the length of the correction factor. The receiver may be configured to leave the ready state early if a certain criterion is met, e.g. if a data packet is fully or partially received within the duration of the listening window. The receiver may move from the ready state to a communicating state if one of the connection-event data packets is fully or partially received during the listening window. The receiver may be configured to enter the sleep state when it is not in the ready state or in a communicating state.

The receiver clock signal may be received by the receiver, e.g. from an external oscillator, or it may be generated by the receiver, e.g. using a crystal or resistor-capacitor oscillator. Similarly, the transmitter clock signal may be received by the transmitter or may be generated by the transmitter.

The receiver clock signal may have a different characteristic when the receiver is in a sleep state from when it is in a ready or communicating state. In particular, the signal may be generated from a first clock source when the receiver is in a sleep state and from a second clock source when it is in a ready or communicating state. The first clock source may have a lower power consumption, but be relatively less accurate than the second clock source. For example, the first clock source may be a resistor-capacitor oscillator while the second clock source may be a crystal oscillator.

The radio transmitter may be configured to transmit the succession of connection-event data packets at regular intervals; i.e. the transmitter may be configured so that the interval between connection-event data packets is a constant number of transmitter clock cycles. However, more complicated transmission schedules are possible; for example, transmitting the connection-event data packets after variable numbers of transmitter clock cycles, or systematically skipping a data packet at scheduled connection events.

The transmitter may transmit other data packets which are not connection-event data packets. They may be interspersed with packets from the succession of data packets. For example, a bi-directional exchange of other data packets may follow a connection-event data packet, e.g. while the receiver is in a communicating state before it enters the sleep state to await the next connection-event data packet. The other data packets may resemble the connection-event data packets, but in some embodiments only the connection-event data packets can cause a radio receiver to wake from a sleep state.

The clock cycles of each clock signal may be the fundamental oscillations of an oscillator, such as a quartz crystal, or they may be derived therefrom. For example, they may be a constant multiple of the period of a fundamental oscillator.

The determination of when a number of clock cycles elapses after receiving a data packet may be made with reference to any part of the data packet. In some embodiments, it is from when the start of the data packet is received by the receiver. Similarly, an interval between two data packets may be from any parts of the packets, but preferably stretches from the start of the first packet to the start of the second packet, since the data packets may have variable lengths. A connection-event data packet need not necessarily contain a data payload; it may simply consist of header information.

The invention can be viewed from a number of aspects. From another aspect, the invention provides a radio communication system comprising a radio transmitter and a radio receiver configured to receive radio transmissions from the radio transmitter, wherein the radio transmitter is configured to use a transmitter clock signal to transmit a regular succession of connection-event data packets by radio, with a constant number of transmitter clock cycles between successive data packets, wherein the period of the transmitter clock signal is stable over the duration of the constant number of transmitter clock cycles up to a first predetermined maximum parts-per-million error; and wherein the radio receiver:
  is configured to enter a sleep state between receiving successive connection-event data packets from the radio transmitter, in which state the radio receiver does not receive and process radio transmissions from the radio transmitter; and
  is configured to use a receiver clock signal, which is stable over the duration of the constant number of transmitter clock cycles up to a second predetermined maximum parts-per-million error, to enter and remain in a ready state, in which the radio receiver is able to receive and process radio transmissions from the radio transmitter, for a number of receiver clock cycles substantially no greater than twice the sum of the first and second predetermined maximum parts-per-million errors multiplied by the number of receiver clock cycles between the most-recently received connection-event data packet and an expected arrival time of the next connection-event data packet.

From another aspect, the invention provides a method of operating a radio transmitter and a radio receiver, comprising:
  the radio transmitter using a transmitter clock signal to transmit a regular succession of connection-event data packets by radio, with a constant number of transmitter clock cycles between successive data packets, wherein the period of the transmitter clock signal is stable over the duration of the constant number of transmitter clock cycles up to a first predetermined maximum parts-per-million error;
  the radio receiver entering a sleep state between receiving successive connection-event data packets from the radio transmitter, in which state the radio receiver does not receive and process radio transmissions from the radio transmitter; and
  the radio receiver using a receiver clock signal, which is stable over the duration of the constant number of transmitter clock cycles up to a second predetermined maximum parts-per-million error, to enter and remain in a ready state, in which the radio receiver is able to receive and process radio transmissions from the radio transmitter, for a number of receiver clock cycles substantially no greater than twice the sum of the first and second predetermined maximum parts-per-million errors multiplied by the number of receiver clock cycles between the most-recently received connection-event data packet and an expected arrival time of the next connection-event data packet.

From a still further aspect, the invention provides a radio receiver, suitable for receiving radio transmissions from a radio transmitter that uses a transmitter clock signal to transmit a regular succession of connection-event data packets by radio, with a constant number of transmitter clock cycles between successive data packets, wherein the period of the transmitter clock signal is stable over the duration of the constant number of transmitter clock cycles up to a first predetermined maximum parts-per-million error, wherein the radio receiver:
- is configured to enter a sleep state between receiving successive connection-event data packets from the radio transmitter, in which state the radio receiver does not receive and process radio transmissions from the radio transmitter; and
- is configured to use a receiver clock signal, which is stable over the duration of the constant number of transmitter clock cycles up to a second predetermined maximum parts-per-million error, to enter and remain in a ready state, in which the radio receiver is able to receive and process radio transmissions from the radio transmitter, for a number of receiver clock cycles substantially no greater than twice the sum of the first and second predetermined maximum parts-per-million errors multiplied by the number of receiver clock cycles between the most-recently received connection-event data packet and an expected arrival time of the next connection-event data packet.

The skilled person will appreciate that, when the worst-case, short-term error of the transmitter and receiver clock signals can be characterised in this way, the receiver can be configured to save energy by limiting the time it spends in a ready state to an amount just sufficient to allow for such short-term errors. The listening window can therefore be significantly shorter than if it had to allow for all possible errors in the clock signals. In embodiments of these aspects of the invention, long-term errors are preferably taken into account by the receiver determining when to enter the ready state by one of the approaches described above, rather than by having a wide listening window.

The receiver may enter the ready state (i.e. open a listening window) before the expected arrival time of the next connection-event data packet by half the maximum listening window duration.

The maximum parts-per-million error may be determined at a predetermined statistical confidence level; e.g. with 90% confidence that a larger error will not be experienced over a set time period. The parts-per-million error may be defined for an open-ended or a fixed time period.

In any of the foregoing aspects, the radio transmitter may be configured to transmit to the radio receiver information relating to a predetermined maximum error for the transmitter clock, although this is not essential. The width of the listening window may instead be set using an estimated or presumed value for the radio transmitter accuracy.

Features of any embodiment or aspect described herein may be used in any of the other embodiments or aspects wherever appropriate.

Certain preferred embodiments of the invention will now be described, by way of example only, with reference to the accompanying drawings, in which:

FIG. 3 is a timing diagram of an exemplary data exchange according to an embodiment of the present invention.

Figure 1:
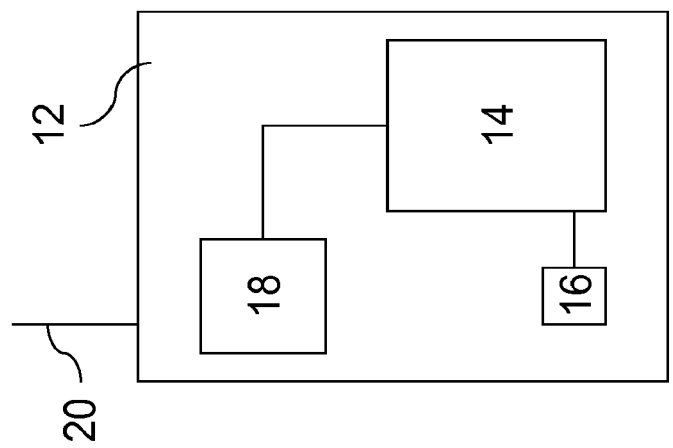
FIG. 1 is a schematic diagram of components of a radio communication system embodying the present invention.
Figure 1:
Figure 1:
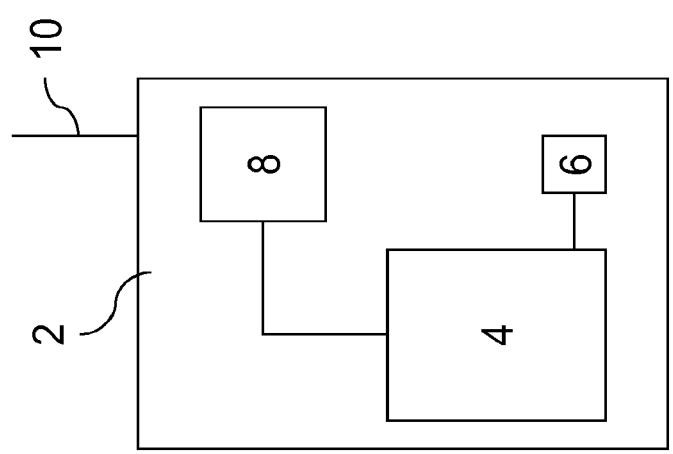

FIG. 1 shows a master device 2 which has a microprocessor 4 which receives a clock signal from an oscillator 6 and which controls analogue radio transmitter circuitry 8. The master device 2 also has a radio antenna 10 for transmitting radio signals.

Also shown is a slave device 12 which has a microprocessor 14 which receives a clock signal from an oscillator 16 and which controls analogue radio receiving circuitry 18. The slave device 12 has a radio antenna 20 for receiving radio signals from the master device 2.

It will be appreciated that these components are shown schematically and may take any suitable form. In some embodiments, the microprocessor 4, 14 and analogue circuitry 8, 18 of the master device 2 or slave device 12 may be integrated in a radio-on-a-chip. Such a chip may also comprise the antenna 10, 20 and/or oscillator 6, 16. The oscillators 6, 16 may be crystal oscillators or resistor-capacitor oscillators or any other suitable oscillators.

The master device 2 may also comprise radio receiving circuitry, and the slave device 12 may comprise radio transmitter circuitry, such that bidirectional communication between the two is possible.

The master device 2 and slave device 12 may be configured to exchange radio data substantially in accordance with the Bluetooth Low Energy™ specification.

FIG. 3 illustrates schematically a data transmission from the master device 2 to the slave device 12 according to an embodiment of the present invention. The horizontal time axis is not to scale (in particular, the sleep period between data packets will typically be many times longer than the listening window).

Those elements of the master device 2 and slave device 12 which do not relate directly to the timing of the listening windows on the slave device 12 may be in accordance with the Bluetooth Low Energy™ specification.

In the exemplary data exchange, the master device 2 (TX) transmits a succession of data packets 22a', 22b', 22c' at regular intervals, each of which may mark the start of a respective connection event. Other data packets (not shown) may be sent in either direction between the master device 2 and slave device 12 immediately following one of these connection-event data packets 22a', 22b', 22c'. Once the data exchange within a connection event ceases, the slave device 12 (RX) enters sleep mode, in which some or all of its receive circuitry 18 and/or some of its microprocessor logic 16 may be powered down. The slave device 12 may use a more accurate oscillator during transmission, and revert to using a lower-power, less accurate oscillator 16 for the clock signal while in sleep mode.

Ignoring, or adjusting for, any transmission delays (potentially due to delays in the transmit circuitry 8 and/or receive circuitry 18), each of the data packets 22a', 22b', 22c' can be considered to be received instantaneously by the slave device 12. However, because the transmitter oscillator 6 and the receiver oscillator 16 are unsynchronised, the lengths of the intervals 34a, 34b between the successive connection-event data packets 22a', 22b' and 22b', 22c' as measured by the slave device 12 may be different from their lengths 24a', 24b' as measured by the master device 2. While the master device 2 intends to send the connection-event data packets at regular intervals, in reality, the intervals may be inaccurate relative to true time, and further apparent inaccuracy may be present relative to the slave device's 12 clock signal.

For the first two packets of a session, the slave device 12 may adopt a cautious approach and open a relatively wide listening window 28' which starts a relatively long period 30' before the expected arrival of the packet 22b'. It can keep the window 28' open for up to a relatively long maximum period 32' after the expected arrival time, if the packet is not received sooner.

For subsequent packets, however, the slave device 12 compensates for slow-changing drift between the master device 2 and slave device 12 clock signals by noting the actual measured interval 34a between the two most recently received connection-event packets 22a', 22b' and using this measurement to determine when to expect the next data packet 22c' to arrive. The size of the interval 34a between the two most recently received data packets 22a', 22b' can be stored in a register or in memory as a variable which is updated continually. This effectively measures the relative timing error between the master and slave clock signals with very low memory requirements, which can be especially advantageous in low-end devices.

Figure 2:
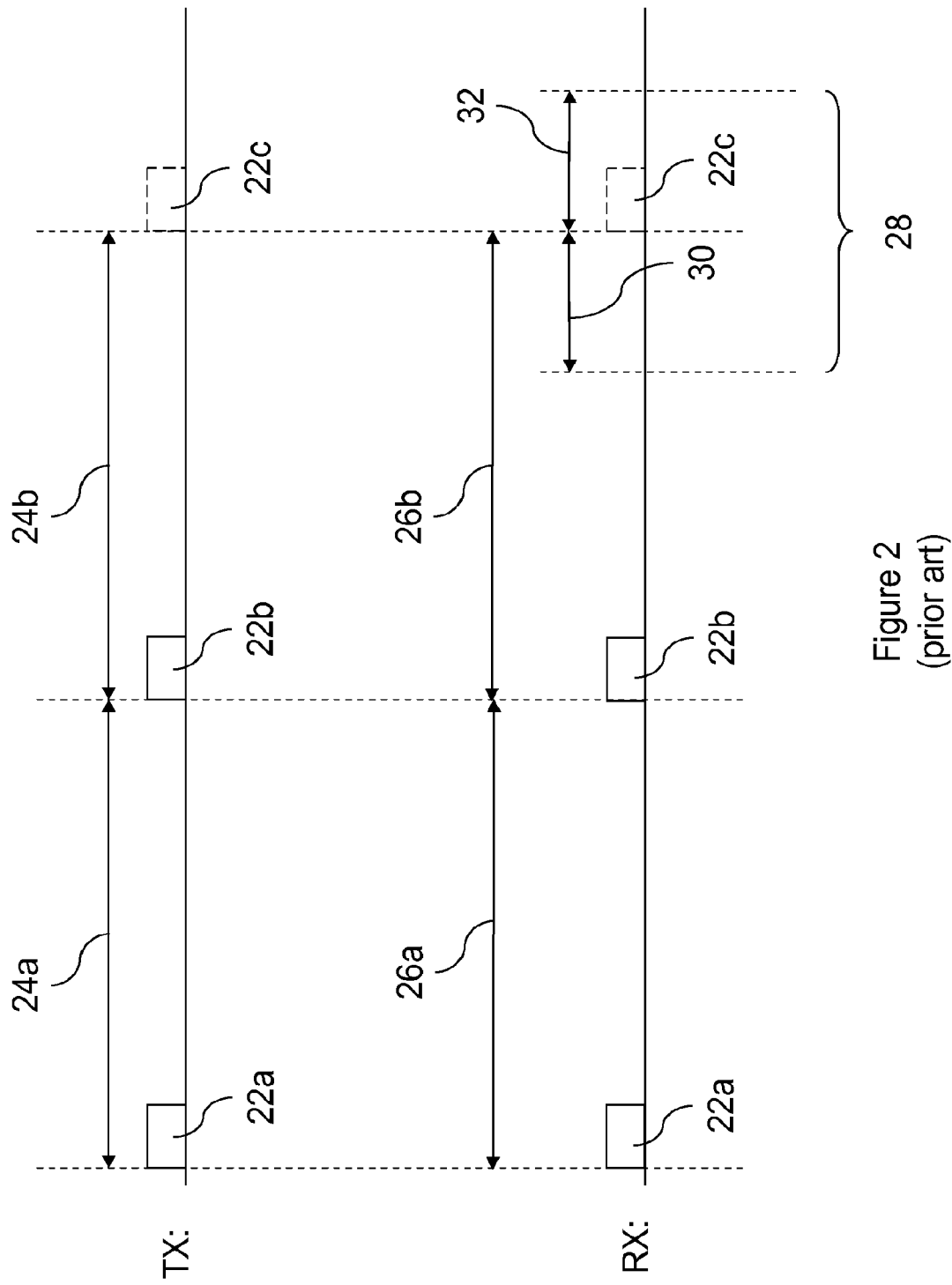
FIG. 2 is a timing diagram of an exemplary data exchange according to a prior art implementation.

For these subsequent packets, the slave device 12 can enter a ready state—i.e. opens a listening window 36—a relatively short period 38 before the expected arrival time of the next data packet 22c'. This period 38 can be smaller than the equivalent period 30 in the prior-art implementation of FIG. 2, since it only needs to allow for fast-changing clock errors, rather than allowing for both fast-changing and slow-changing clock errors. The standard period 38 may be of fixed duration, or it may vary, e.g. depending on packet loss rates. The listening window 36 may remain open for up to the same period 40 after the expected arrival time of the data packet 22c', if the packet has not already been received by then.

If the data packet 22c' is not received correctly, perhaps because of radio interference or because the slave device 12 moved out of range of the master device 2, or possibly because of an extreme short-term error, the slave device 12 may expect a further data packet after another period of time corresponding to the interval between the two last-received data packets 22a', 22b' but may increase the size of the listening window for this next data packet, to proportionally compensate for the modelled short-term variation relative to the last successfully-received connection-event data packet. The listening window may be scaled up in size linearly with the amount of time since the last-received data packet 22b'. After several lost data packets, the connection may be deemed lost, and a resynchronisation process may be initiated.

As an example of the savings possible using the invention, the interval between the successive data packets 22a, 22b, 22c may be intended to be one second. The maximum relative drift between the master and slave clock signals might typically be 1000 parts per million (ppm), of which slow-changing drift typically accounts for 950 ppm and fast-changing errors typically account for 50 ppm. In the prior-art approach of FIG. 2, the listening window 28 will be opened one millisecond before the expected arrival of each data packet. Assuming the data packet arrives approximately when expected, this results in the slave device's receive circuitry being powered up unnecessarily on average for one millisecond every second.

By contrast, in the embodiment of FIG. 3, the listening window 36 is opened fifty microseconds before the expected arrival of each data packet. Assuming the data packet arrives approximately when expected, this results in the slave device's 12 receive circuitry 18 being powered up unnecessarily on average for only fifty microseconds every second, resulting in a substantial power saving.

The invention claimed is:

1. A radio communication system comprising a radio transmitter and a radio receiver configured to receive radio transmissions from the radio transmitter, wherein the radio transmitter is configured to use a transmitter clock signal to transmit a succession of connection-event data packets by radio according to a predetermined schedule, and wherein the radio receiver:

is configured to enter a sleep state between receiving successive connection-event data packets from the radio transmitter, in which sleep state the radio receiver does not receive and process radio transmissions from the radio transmitter; and is configured to use a receiver clock signal to determine when a predetermined number of receiver clock cycles has elapsed after receiving one of the connection-event data packets and, in response, to enter a ready state in which the radio receiver is able to receive and process radio transmissions from the radio transmitter, wherein the predetermined number of receiver clock cycles is the number of receiver clock cycles that elapsed between the respective receipts of two of the connection-event data packets already received by the radio receiver, minus a positive correction factor, so as to cause the radio receiver to enter the ready state before the expected arrival of the next connection-event data packet, by an amount of time that depends of the size of the positive correction factor.

2. The radio communication system of claim 1, wherein the said two connection-event data packets are successively-received connection-event data packets.

3. The radio communication system of claim 2, wherein the said two connection-event data packets are the two most-recently received connection-event data packets.

4. The radio communication system of claim 1, wherein the radio receiver is configured to update a variable stored in memory with a value related to the number of receiver clock cycles elapsed between the respective receipts of the said two connection-event data packets.

5. The radio communication system of claim 4, wherein the radio receiver is configured to update the variable after every received connection-event data packet.

6. The radio communication system of claim 1, wherein the positive correction factor increases with the number of receiver clock cycles elapsed since receipt of the last connection-event data packet.

7. The radio communication system of claim 6, wherein the positive correction factor is a predetermined base value multiplied by the number of clock cycles elapsed since receipt of the last connection-event data packet.

8. The radio communication system of claim 1, wherein the positive correction factor is constant for the duration of a connection with a transmitter.

9. The radio communication system of claim 1, wherein the positive correction factor depends on timing information relating to received connection-event data packets.

10. The radio communication system of claim 1, wherein the positive correction factor depends on variation between expected and actual times of receipt of connection-event data packets.

11. The radio communication system of claim 1, wherein the radio transmitter is configured to transmit the succession of connection-event data packets at regular intervals.

12. A method of operating a radio transmitter and a radio receiver, comprising:

the radio transmitter using a transmitter clock signal to transmit a succession of connection-event data packets by radio according to a predetermined schedule;

the radio receiver entering a sleep state between receiving successive connection-event data packets from the radio transmitter, in which sleep state the radio receiver does not receive and process radio transmissions from the radio transmitter; and the radio receiver using a receiver clock signal to determine when a predetermined number of receiver clock cycles has elapsed after receiving one of the connection-event data packets and, in response, entering a ready state in which the radio receiver is able to receive and process radio transmissions from the radio transmitter, wherein the predetermined number of receiver clock cycles is the number of received clock cycles that elapsed between the respective receipts of two of the connection-event data packets already received by the radio receiver, minus a positive correction factor, so as to cause the radio receiver to enter the ready state before the expected arrival of the next connection-event data packet, by an amount of time that depends of the size of the positive correction factor.

13. The method of claim 12, wherein the said two connection-event data packets are successively-received connection-event data packets.

14. The method of claim 13, wherein the said two connection-event data packets are the two most-recently received connection-event data packets.

15. The method of claim 12, further comprising the radio receiver updating a variable stored in memory with a value related to the number of receiver clock cycles elapsed between the respective receipts of the said two connection-event data packets.

16. The method of claim 15, wherein the radio receiver updates the variable after receiving each connection-event data packet.

17. The method of claim 12, wherein the positive correction factor increases with the number of receiver clock cycles elapsed since receipt of the last connection-event data packet.

18. The method of claim 17, wherein the positive correction factor is a predetermined base value multiplied by the number of clock cycles elapsed since receipt of the last connection-event data packet.

19. The method of claim 12, wherein the positive correction factor is constant for the duration of a connection with a transmitter.

20. The method of claim 12, wherein the positive correction factor depends on timing information relating to received connection-event data packets.

21. The method of claim 12, wherein the positive correction factor depends on variation between expected and actual times of receipt of connection-event data packets.

22. The method of claim 12, wherein the radio transmitter transmits the succession of connection-event data packets at regular intervals.

23. A radio receiver, suitable for receiving radio transmissions from a radio transmitter that transmits a succession of connection-event data packets by radio according to a predetermined schedule, wherein the radio receiver:

is configured to enter a sleep state between receiving successive connection-event data packets from the radio transmitter, in which sleep state the radio receiver does not receive and process radio transmissions from the radio transmitter; and is configured to use a receiver clock signal to determine when a predetermined number of receiver clock cycles has elapsed after receiving one of the connection-event data packets and, in response, to enter a ready state in which the radio receiver is able to receive and process radio transmissions from the radio transmitter, wherein the predetermined number of receiver clock cycles is the number of receiver clock cycles that elapsed between the respective receipts of two of the connection-event data packets already received by the radio receiver, minus a positive correction factor, so as to cause the radio receiver to enter the ready state before the expected arrival of the next connection-event data packet, by an amount of time that depends of the size of the positive correction factor.

24. The radio receiver of claim 23, wherein the said two connection-event data packets are successively-received connection-event data packets.

25. The radio receiver of claim 24, wherein the said two connection-event data packets are the two most-recently received connection-event data packets.

26. The radio receiver of claim 23, configured to update a variable stored in memory with a value related to the number of receiver clock cycles elapsed between the respective receipts of the said two connection-event data packets.

27. The radio receiver of claim 26, configured to update the variable after every received connection-event data packet.

28. The radio receiver of claim 23, wherein the positive correction factor increases with the number of receiver clock cycles elapsed since receipt of the last connection-event data packet.

29. The radio receiver of claim 28, wherein the positive correction factor is a predetermined base value multiplied by the number of clock cycles elapsed since receipt of the last connection-event data packet.

30. The radio receiver of claim 23, wherein the positive correction factor is constant for the duration of a connection with a transmitter.

31. The radio receiver of claim 23, wherein the positive correction factor depends on timing information relating to received connection-event data packets.

32. The radio receiver of claim 23, wherein the positive correction factor depends on variation between expected and actual times of receipt of connection-event data packets.

* * * * *